United States Patent [19]
Ueno et al.

[11] Patent Number: 5,999,995
[45] Date of Patent: Dec. 7, 1999

[54] SYSTEMS FOR ADJUSTING A TRANSFER RATE BETWEEN A HOST AND A PERIPHERAL BASED ON A CALCULATION OF THE PROCESSING RATE OF THE HOST

[75] Inventors: Hiroshi Ueno; Hideaki Imaizumi, both of Tokyo, Japan

[73] Assignee: Oki Data Corporation, Tokyo, Japan

[21] Appl. No.: 08/995,231

[22] Filed: Dec. 19, 1997

[30] Foreign Application Priority Data

Dec. 27, 1996 [JP] Japan ................................. 7-350223

[51] Int. Cl.⁶ ................................................ G06F 15/02
[52] U.S. Cl. .......................... 710/60; 710/58; 365/193; 709/253; 714/745
[58] Field of Search ........................ 710/60, 58; 365/193; 709/253; 714/745

[56] References Cited

U.S. PATENT DOCUMENTS

| | | | |
|---|---|---|---|
| 5,060,239 | 10/1991 | Briscoe et al. | 375/260 |
| 5,157,769 | 10/1992 | Eppley et al. | 709/253 |
| 5,220,659 | 6/1993 | Larson et al. | 395/500 |
| 5,237,676 | 8/1993 | Arimilli et al. | 710/60 |
| 5,268,906 | 12/1993 | Free | 714/745 |
| 5,293,497 | 3/1994 | Free | 710/130 |
| 5,388,250 | 2/1995 | Lewis et al. | 710/60 |
| 5,513,326 | 4/1996 | Nute | 710/60 |
| 5,621,820 | 4/1997 | Rynderman et al. | 382/39 |
| 5,768,627 | 6/1998 | Jones et al. | 710/60 |

*Primary Examiner*—Thomas C. Lee
*Assistant Examiner*—Jacob F. Hart
*Attorney, Agent, or Firm*—Akin, Gump, Strauss, Hauer & Feld, L.L.P.

[57] ABSTRACT

A data transfer system has a PC as a host computer, a terminal unit such as a printer and a parallel interface cable through which data is transferred between the PC and the terminal unit. The PC transfers a strobe signal as a rate detection signal which contains points of change to the terminal unit. The terminal unit receives the strobe signal and calculates the data processing rate of the PC on the basis of the points of change of the strobe signal. The PC adjusts the data transfer rate of the PC on the basis of a result of comparison of the data processing rate of the PC calculated by the terminal unit and a processing rate of the terminal unit.

8 Claims, 9 Drawing Sheets ized by the long strobe interval, a slow data transfer rate is established, resulting in a failure to take a full utilization of the capacity of the terminal unit.

SYSTEMS FOR ADJUSTING A TRANSFER RATE BETWEEN A HOST AND A PERIPHERAL BASED ON A CALCULATION OF THE PROCESSING RATE OF THE HOST

BACKGROUND OF THE INVENTION

The present invention relates to a data transfer system having a host computer and a terminal unit connected together by, for example, a Centronics cable.

In a conventional data transfer system having a personal computer (hereinafter referred to as a PC) as a host computer and a terminal unit which are connected together by a Centronics cable, when the data is transferred from the PC to the terminal unit, the data transfer rate is adjusted by the PC. In a parallel interface between the PC and the terminal unit of such data transfer system, a parallel port signal as defined in the IEEE 1284 standard is employed for the data transfer. The IEEE 1284 standard includes a compatibility mode (in forward direction) which is used to transfer the data from the PC to the terminal unit and a nibble mode (in reverse direction) which is used to transfer the data from the terminal unit to the PC.

During the data transfer from the PC to the terminal unit, if a data processing rate of the PC is above a data processing rate of the terminal unit, the data processing in the terminal unit cannot catch up with the data transfer from the PC. On the contrary, if the data transfer rate is lagging with respect to the receiving capacity of the terminal unit, a full utilization of the capacity of the terminal unit is prevented.

In the conventional data transfer system, the PC repeats trials of transmitting a signal to the terminal unit while changing a strobe interval in accordance with a program in the PC. The terminal unit judges whether or not the strobe interval is long enough to be able to receive the data transferred from the PC in a normal manner. If the terminal unit judges the strobe interval is long enough, the terminal unit transmits a notice of the proper data transfer rate to the PC, whereupon a proper strobe interval is established by the PC. On the contrary, if the terminal unit judges the strobe interval is too short, the strobe interval is changed by adding a given increment time, whereupon the PC repeats trials of transmitting a signal to the terminal unit.

However, the PC is not provided with a timer which is able to measure a sufficiently small increment time used for changing the strobe interval during the repetitive trials of transmitting the signal to the terminal unit. Therefore, the conventional data transfer system cannot use a proper increment time for changing the strobe interval.

If too small increment time is used for changing the strobe interval, the number of trials of transmitting the signal to the terminal unit must be increased, resulting in an increased length of time until the PC receives the notice of the proper data transfer rate. On the contrary, if too large increment time is used for changing the strobe interval, the long strobe interval, namely, a slow data transfer rate is established, resulting in a failure to take a full utilization of the capacity of the terminal unit.

SUMMARY OF THE INVENTION

It is an object of the present invention to provide a data transfer system which is capable of shortening a time required for data transfer from a PC to a terminal unit and capable of a full utilization of capacity of the terminal unit.

According to the present invention, a data transfer system comprises: a host computer for processing data at a data processing rate and transferring the data at a data transfer rate; a terminal unit for receiving the data transferred from the host computer; and a cable through which the data is transferred between the host computer and the terminal unit. The host computer transfers a rate detection signal which contains information regarding the data processing rate of the host computer to the terminal unit. The terminal unit receives the rate detection signal and calculates the data processing rate of the host computer on the basis of the rate detection signal. The host computer adjusts the data transfer rate of the host computer on the basis of the data processing rate of the host computer calculated by the terminal unit.

Further, the terminal unit detects points of change of the rate detection signal and measures a time interval between the points of change, and the calculation of the data processing rate on the basis of the rate detection signal by the terminal unit may be conducted on the basis of the time interval between the points of change.

Furthermore, the transfer of the rate detection signal from the host computer may be conducted by setting the rate detection signal to a predetermined value, writing data into the register once and reversing the value of the rate detection signal to generate one of the points of change, reading the written data from the register and reverses the value of the rate detection signal to generate one of the points of change, and repeating selfloop processing a predetermined number of times and reversing the value of the rate detection signal to generate one of the points of change.

Moreover, the transfer of the rate detection signal from the host computer may be conducted by setting the rate detection signal to a predetermined value, writing data into the register a predetermined number of times and reversing the value of the rate detection signal to generate one of the points of change, reading the written data from the register a predetermined number of times and reversing the value of the rate detection signal to generate one of the points of change, and repeating selfloop processing a predetermined number of times and reversing the value of the rate detection signal to generate one of the points of change.

In addition, the adjustment of the data transfer rate on the basis of the data processing rate by the host computer may be conducted on the basis of a result of comparison of the data processing rate of the host computer and a data processing rate of the terminal unit.

Further, in the adjustment of the data transfer rate by the host computer, if the data processing rate of the host computer calculated by the terminal unit is above the data processing rate of the terminal unit, the data transfer rate may be lowered by either reading the written data from the register or repeating the selfloop processing each time the data is transferred from the host computer to the terminal unit.

BRIEF DESCRIPTION OF THE DRAWINGS

The present invention will become more fully understood from the detailed description given hereinbelow and the accompanying drawings which are given by way of illustration only, and wherein.

DETAILED DESCRIPTION OF THE INVENTION

Preferred embodiments of the present invention will be described with reference to the accompanying drawings. It is to be noted that identical symbols are assigned to corresponding parts throughout the drawings.

Figure 1:
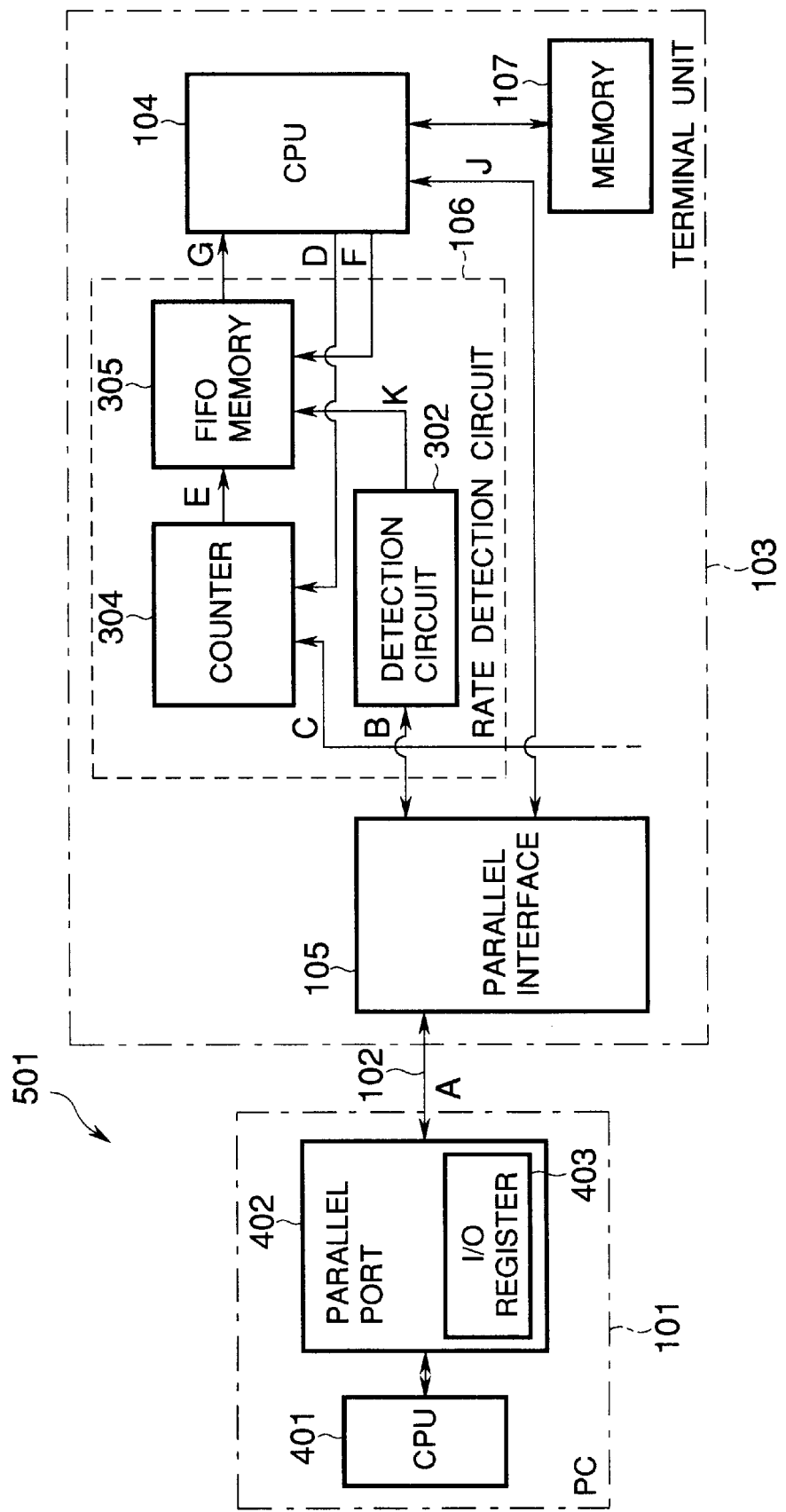
FIG. 1 is a block diagram showing a data transfer system according to a first embodiment of the present invention.
Figure 2:
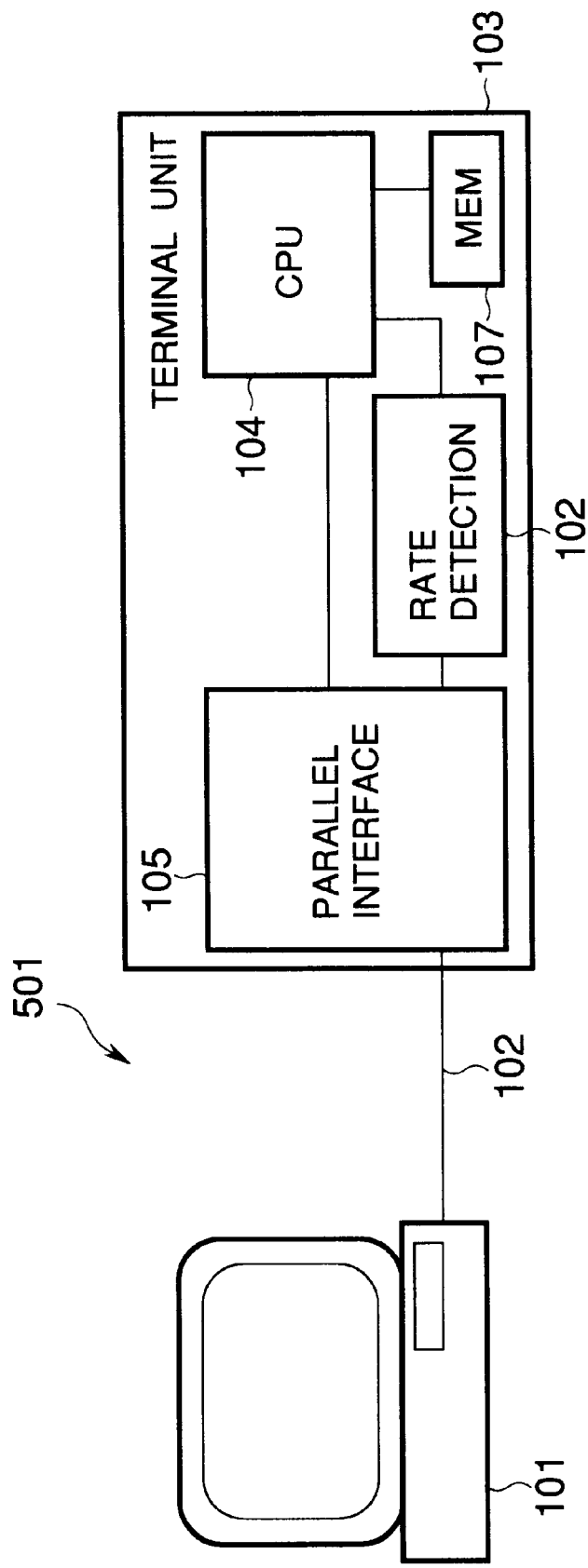
FIG. 2 is a schematic diagram showing the data transfer system of FIG. 1.

FIG. 1 is a block diagram showing a data transfer system according to a first embodiment of the present invention, and FIG. 2 is a schematic diagram showing the data transfer system of FIG. 1.

Referring to FIG. 1 and FIG. 2, the data transfer system 501 of the first embodiment comprises a PC 101 as a host computer, a terminal unit 103 such as a printer, and a parallel interface cable 102 such as a Centronics cable through which data is transferred between the PC 101 and the terminal unit 103.

Referring to FIG. 1, the PC 101 includes a CPU 401 and a parallel port 402 which contains an I/O register 403. The terminal unit 103 includes a parallel interface circuit 105, a rate detection circuit 106, a memory 107 and a CPU 104. The parallel interface cable 102 connects the parallel port 402 in the PC 101 and the parallel interface circuit 105 in the terminal unit 103.

Referring to FIG. 1, the PC 101 transmits a rate detection signal which contains information regarding a data processing rate of the PC 101 through the parallel interface cable 102 to the terminal unit 103. The terminal unit 103 detects the data detection signal and calculates the data processing rate of the PC 101 on the basis of the rate detection signal transmitted from the PC 101. The PC 101 adjusts a data transfer rate to be used in the data transfer from the PC 101 to the terminal unit 103 on the basis of the detected data processing rate of the PC 101.

Referring to FIG. 1, the rate detection circuit 106 in the terminal unit 103 includes a detection circuit 302 for detecting points of change (i.e., points where the change in a value of the rate detection signal occurs) in the rate detection signal B (which is the same as the strobe signal A (parallel interface signal) transmitted from the PC 101 through the parallel interface cable 102) from the interface circuit 105 and outputting a detection signal K which contains information regarding the points of change in a value of the rate detection signal to an FIFO memory 305.

A counter 304 receives a clock C from an oscillator (not shown in the figure). The FIFO memory 305 stores a count E from the counter 304 when it has received the detection signal K of the point of change from the detection circuit 302.

The CPU 104 outputs a signal F to the FIFO memory 305 to read a count G stored in the FIFO memory 305. Further, a control signal J from the interface circuit 105 is inputted to the CPU 104. Moreover, the CPU 104 also outputs a control signal D to the counter 304 to control the operation of the counter 304.

In above-described data transfer system 501, the terminal unit 103 detects the points of change in the strobe signal as the rate detection signal which is prepared and transmitted by the PC 101, and on the basis of a result of such detection, calculates the data processing rate of the PC 101. Specifically, the terminal unit 103 measures the time required for the CPU 401 of the PC 101 to write data into the I/O register 403 in the parallel port 402, the time required for the CPU 401 to read data from the I/O register 403, and the time required for an internal program in the CPU 401 to complete a predetermined times of selfloop processing.

The operation of the data transfer system 501 for detecting the data processing rate of the PC 101 will be described more specifically with reference to the drawings.

Figure 3:
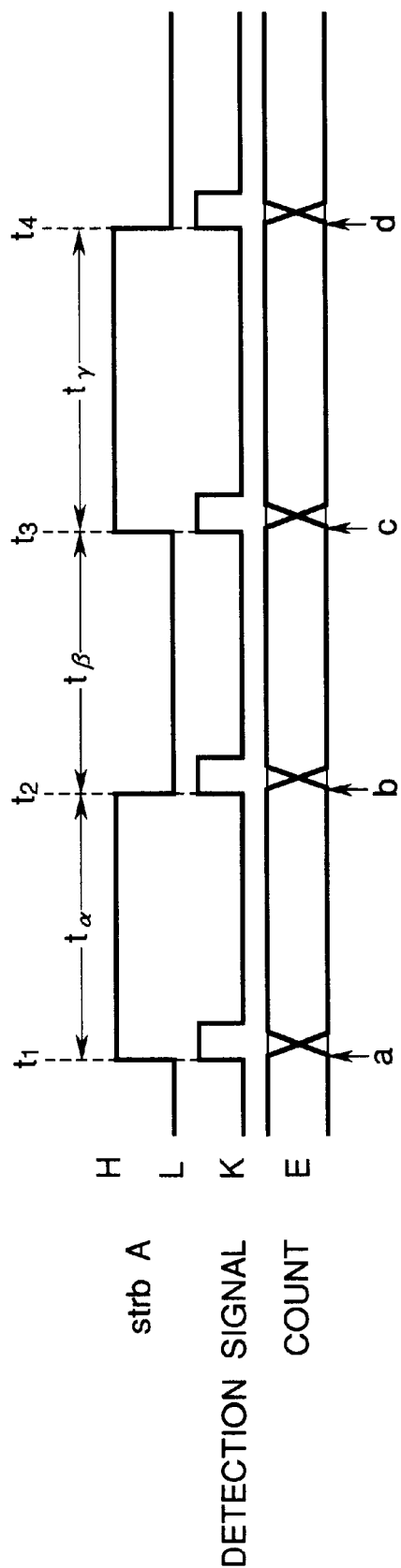
FIG. 3 is a timing chart showing points of change of the strobe signal in the data transfer system according to the first embodiment.
Figure 4:
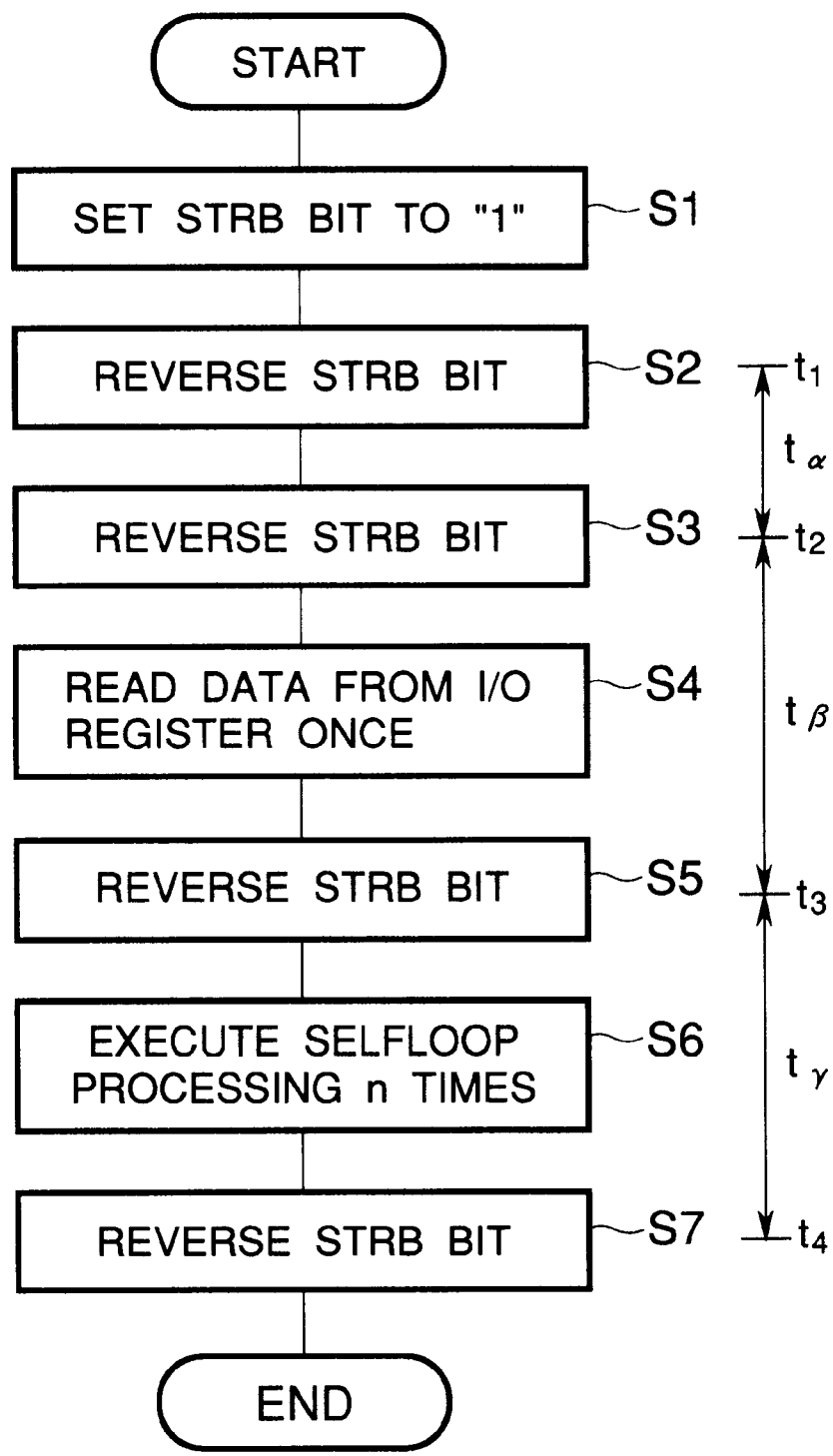
FIG. 4 is a flowchart showing process in the PC of producing the strobe signal according to the first embodiment.
Figure 5:
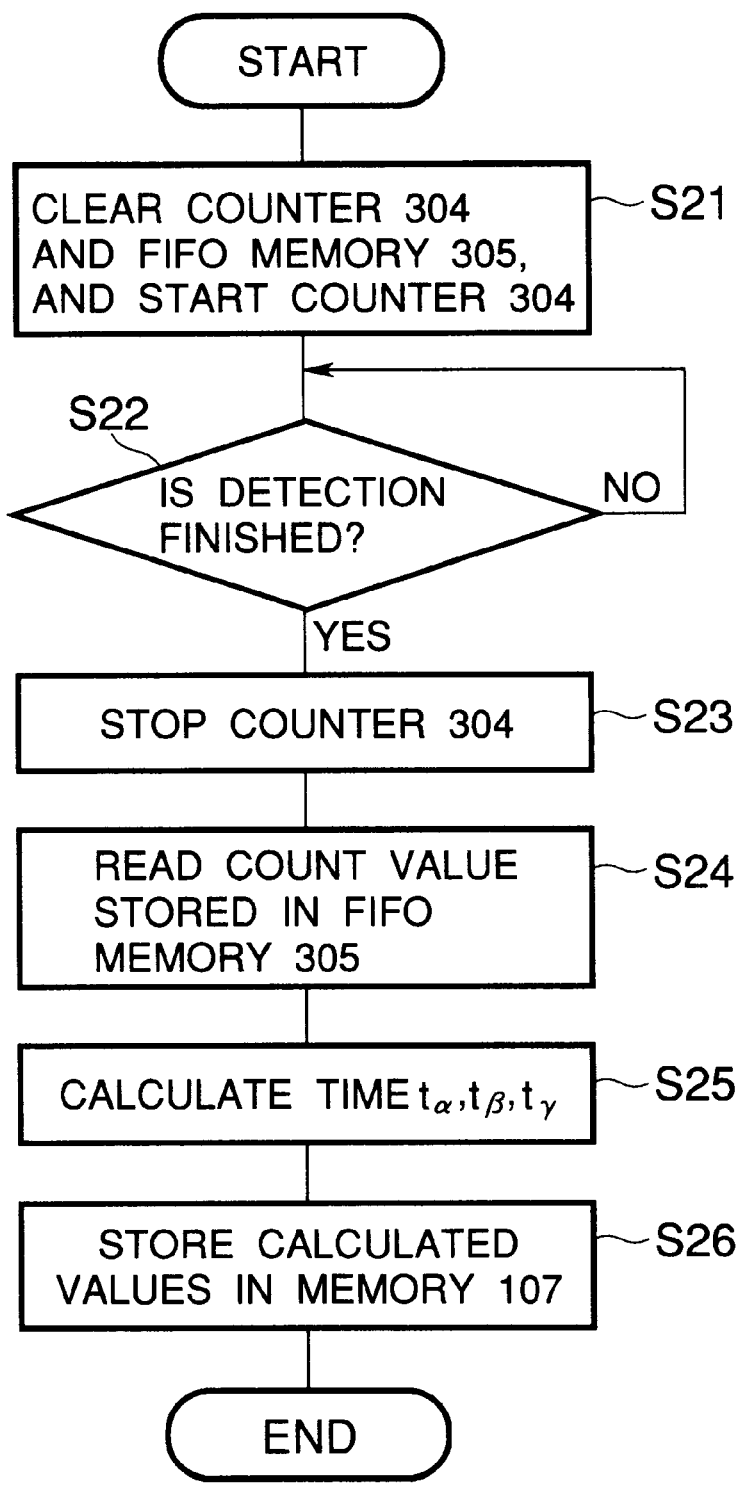
FIG. 5 is a flowchart showing process in the terminal unit of calculating the data processing rate of the PC according to the first embodiment.
Figure 6:
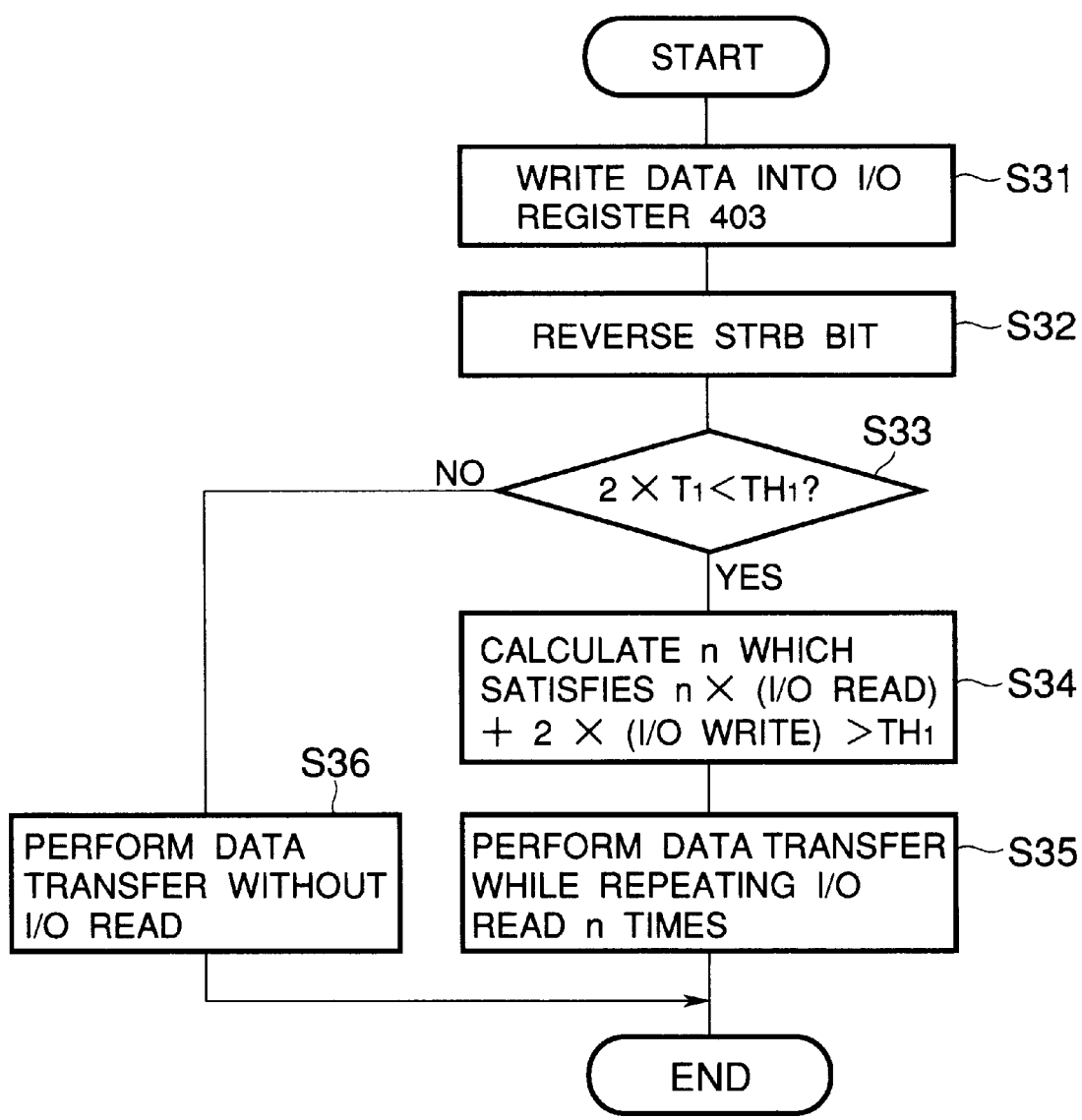
FIG. 6 is a flowchart showing process in the PC of adjusting a data transfer rate according to the first embodiment.

FIG. 3 is a timing chart showing points of change in a value of the strobe signal used for detecting the data processing rate of the PC, FIG. 4 is a flowchart showing process in the PC of producing the strobe signal according to the first embodiment, FIG. 5 is a flowchart showing process in the terminal unit of calculating the data processing rate of the PC according to the first embodiment, and FIG. 6 is a flowchart showing process in the PC of adjusting a data transfer rate according to the first embodiment.

First, the operation in the PC 101 of transmitting the rate detection signal will be described with reference to FIG. 4. In the first embodiment, a strobe signal A (hereinafter referred to as strb A) produced in the PC 101 is utilized as the rate detection signal. However, it should be noted that the rate detection signal used for detecting the data processing rate of the PC 101 is not limited to the strb A, but any other control signals containing the information regarding the data processing rate of the PC 101 may be used in place of the strb A. Further, in the PC 101, when a bit (hereinafter referred to as a strb bit) of the strobe signal in the I/O register 403 is set to "1", a reversed level, namely, a low level (hereinafter referred to as L level) appears in the Centronics cable as the strb A. On the other hand, when the strb bit of the strobe signal in the I/O register 403 is set to "0", a reversed level, namely, a high level (hereinafter referred to as H level) appears in the Centronics cable as the strb A.

Referring to FIG. 4, when the CPU 401 in the PC 101 sets the strb bit of the strobe signal in the I/O register 403 of the parallel port 402 to "1" (step S1), the strb A (shown in FIG. 3) drops to L level. Next, the CPU 401 reverses the strb bit in the I/O register 403 to "0" (step S2), whereupon the strb A rises to H level at a point of time $t_1$ (shown in FIG. 3). Subsequently, the CPU 401 reverses the strb bit in the I/O register 403 to "1" (step S3), whereupon the strb A drops to L level at a point of time $t_2$ (shown in FIG. 3).

The CPU 401 in the PC 101 then reads a status of the parallel port 402, that is, reads the data from the I/O register 403 (step S4) and upon completing this reading operation, again reverses the strb bit in the I/O register 403 to "0" (step S5), whereupon the strb A again rises to H level again at a point of time $t_3$ (shown in FIG. 3). Finally, the CPU 401 executes selfloop processing n times (n is an integer not less than 1) according to a program which is saved in the CPU 401 itself, and then reverses the strb bit in the I/O register 403 to "1" (step S6), whereupon the strb A drops to L level (step S7) at a point of time $t_4$ (shown in FIG. 3), thus completing the transmission of the rate detection signal.

The operation of the terminal unit 103 to calculate the data processing rate will now be described. Referring to FIG. 5, the CPU 104 in the terminal unit 103 clears the counter 304 and the FIFO memory 305, and starts the operation of the counter 304 (step S21). At this time, the counter 304 is enabled to count the clock C. The rate of the clock C is fast enough to allow a change in the strb A to be detected in a satisfactory manner and the counter 304 has a counting capacity to count every step in the operation of the PC 101 to transmit the rate detection signal. Specifically, the clock C has a frequency of 10 [MHz] and an accuracy of 0.1 [$\mu$s] while the counter 304 contains a number of bits on the order of ten bits, enabling 100 [82 s] to be counted.

The CPU 104 then monitors a control signal J from the parallel interface circuit 105 to judge whether or not the detection of the points of change in the strb A has been completed (step S22). In the meantime, the detection circuit 302 produces a point of change detection signal K at each of points of time $t_1$, $t_2$, $t_3$ and $t_4$ where a change occurs in the strb A which is transmitted from the PC 101. The count E (shown in FIG. 3 by a, b, c and d) which prevails in the counter 304 is written into the FIFO memory 305 when the detection signal K is inputted, thus completing the detection of the points of change in the strb A. The FIFO memory 305 has a capacity to store these count values a, b, c and d.

If the CPU 104 judges that the detection is completed at the step S22, the CPU 104 stops the operation of the counter 304 (step S23), and reads the count values a, b, c and d stored in the FIFO memory 305 by controlling the signal F (step S24). The signal F is normally formed by using an I/O read signal for the CPU 104. The CPU 104 then calculates the strobe intervals $t_\alpha$, $t_\beta$ and $t_\gamma$ from the read count values a, b, c and d according to the equations given below (step S25):

$$t_\alpha = b - a \quad (1)$$

$$t_\beta = c - b \quad (2)$$

$$t_\gamma = d - c \quad (3)$$

The CPU 104 writes these values into the memory 107 (step S26), thus completing the detection of the points of change in the strb A. Using the values obtained from the equations (1), (2), and (3), the time $T_1$ required for the CPU 401 of the PC 101 to write a signal to the I/O register 403 in the parallel port 402, the time $T_2$ required for the CPU 401 to read data from the I/O register 403 in the parallel port 402, and the time $T_3$ required to execute the selfloop processing n times according to a program stored in the CPU 401 are calculated according to equations (4), (5) and (6) given below.

$$T_1 = t_\alpha \quad (4)$$

$$T_2 = t_\beta - t_\alpha \quad (5)$$

$$T_3 = t_\gamma - t_\alpha \quad (6)$$

Subsequently, the CPU 104 in the terminal unit 103 transmits the times $T_1$, $T_2$, and $T_3$ to the PC 101 in response to a request from the PC 101. In the above description, the times $T_1$, $T_2$, and $T_3$ are calculated by the terminal unit 103, but alternatively, the terminal unit 103 may transmit the strb intervals $t_\alpha$, $t_\beta$ and $t_\gamma$ to the PC 101, which may then calculate the times $T_1$, $T_2$ and $T_3$.

The data transfer operation by the PC 101 will now be described with reference to FIG. 6. The PC 101 adjusts a data transfer rate on the basis of the data processing rate of the PC 101 itself which has been measured by the terminal unit 103. Referring to FIG. 6, the CPU 401 in the PC 101 writes data into the I/O register 403 (step S31), and then reverses the strb bit (step S32) which is used to latch the data in the terminal unit 103. Next, the CPU 401 judges whether or not the access time $T_1 \times 2$ to the I/O register 403 for two accesses, namely, for the data entry and the reversal of the strb bit is greater than a given reference value $TH_1$ (step S33). In this embodiment, the reference value $TH_1$ is chosen to be 5 [$\mu$s], for example, which represents the maximum rate for the data reception by the terminal unit 103.

To give an example, if it is assumed that the rate at which the CPU 401 writes data into the I/O register 403 of the parallel port 402 and the rate at which the strb bit is reversed in the I/O register 403 are both equal to 1 [$\mu$s/byte], two accesses to the I/O register 403 including the data entry and the reversal of the strb bit are effective to the transfer data, and accordingly, the data transfer rate by the PC 101 is equal to 1 [$\mu$s/byte]$\times$2=2 [$\mu$s/byte]. On the other hand, assuming that the data reception rate of the terminal unit 103 is equal to 5 [$\mu$s/byte] at maximum, this means that the reception rate is slower than the data transfer rate, preventing the terminal unit 103 from receiving data in a normal manner. However, if the rate of writing data into the I/O register 403 of the parallel port 402 by the CPU 401 and the rate of reversing the strb bit are both equal to 4 [$\mu$s], the data transfer rate by the PC 101 will be equal to 4 [$\mu$s/byte]$\times$2=8 [$\mu$s/byte], which is slower than the data reception rate of 5 [$\mu$s/byte] of the terminal unit 103, and thus the terminal unit 103 is capable of normally receiving data.

When the access time to the I/O register 403 is less than the reference value $TH_1$, for example, 5 [$\mu$s], the CPU 401 in the PC 101 calculates the number of times, n, to read data from the I/O register 403 of the parallel port 402 (step S34) for adjusting the data transfer rate of the PC 101. Specifically, subsequent to the two accesses to the I/O register 403 including the data entry (I/O write) and the reversal of the strb bit (I/O write), the CPU 401 performs a data read (I/O read) operation n times from the I/O register 403 of the parallel port 402 before data is set for the next time so that a sum of two access time plus a time until the next data entry becomes greater than 5 [$\mu$s].

For example, if the time $T_2$ required for the CPU 401 to read data from the I/O register 403 of the parallel port 402 is equal to 1 [$\mu$s] and a number of times n that data is read is equal to 4, $$T_1 \times 2 + T_2 \times 4 = 1 \ [\mu s] \times 2 + 1 \ [\mu s] \times 4 = 6 \ [\mu s] > 5 \ [\mu s] \quad (7)$$

This means that the data transfer rate of the PC 101 is slower than the data reception rate which represents the maximum rate for the data reception by the terminal unit 103. The PC 101 performs data read-out from the I/O register 403 of the parallel port 402 four times subsequent to two accesses to the I/O register 403. While Repeating this cycle, the PC 101 performs a data transfer to the terminal unit 103 (step S35). On the contrary, when the access time to the I/O register 403 is greater than 5 [$\mu$s], the PC 101 performs a data transfer to the terminal unit 103 by repeating a data setting and reversal of the strb bit without a data read-out from the I/O register 403 of the parallel port 402 (step S36).

While the data transfer rate is adjusted by performing a data read-out n times from the I/O register 403 of the parallel port 402 in the above description, it is also possible to adjust the data transfer rate through the time $T_3$ which is required to repeat the selfloop processing n times according to the program stored in the CPU 401 of the PC 101. For example, if repeating the self loop processing 100 times takes 1 [$\mu s$], it follows that the time required to complete 50 times of the selfloop processing will be equal to 0.5 [$\mu s$]. A transfer time for one byte data as adjusted by a data read-out from the I/O register 403 of the parallel port 402 is equal to 6 [$\mu s$/byte]. Thus, the transfer rate is the reciprocal of this figure, or ⅙ [$\mu s$]=167 [KB(kilo-byte)/second]. A transfer time for one byte data as adjusted by the selfloop processing is given as follows:

$$1\ [\mu s]\times 2 + 0.5\ [\mu s]\times 7 = 5.5\ [\mu s/byte] \tag{8}$$

Accordingly, the transfer rate is calculated as follows, based on the numerical figure given by the equation (9):

$$\tfrac{1}{5.5}\ [\mu s/byte] = 182\ [KB/second] \tag{9}$$

By measuring the transfer rate in this manner, a data transfer is enabled at a rate which is very close to the maximum rate at which the terminal unit 103 can receive data.

Thus it will be seen that it is possible to obtain the proper data transfer rate in a brief period of time by transmitting the strb A as the rate detection signal from the PC 101, receiving the strb A and measuring the strobe interval between the points of change therein by the terminal unit 103, calculating the data processing rate of the PC 101 on the basis of the strobe interval and notifying it to the PC 101, and comparing the data processing rate of the PC 101 with the data processing rate of the terminal unit 103 by the PC 101 to adjust the data transfer rate.

Second Embodiment

Next, a data transfer system according to a second embodiment of the present invention will be described with reference to the accompanying drawings.

Figure 7:
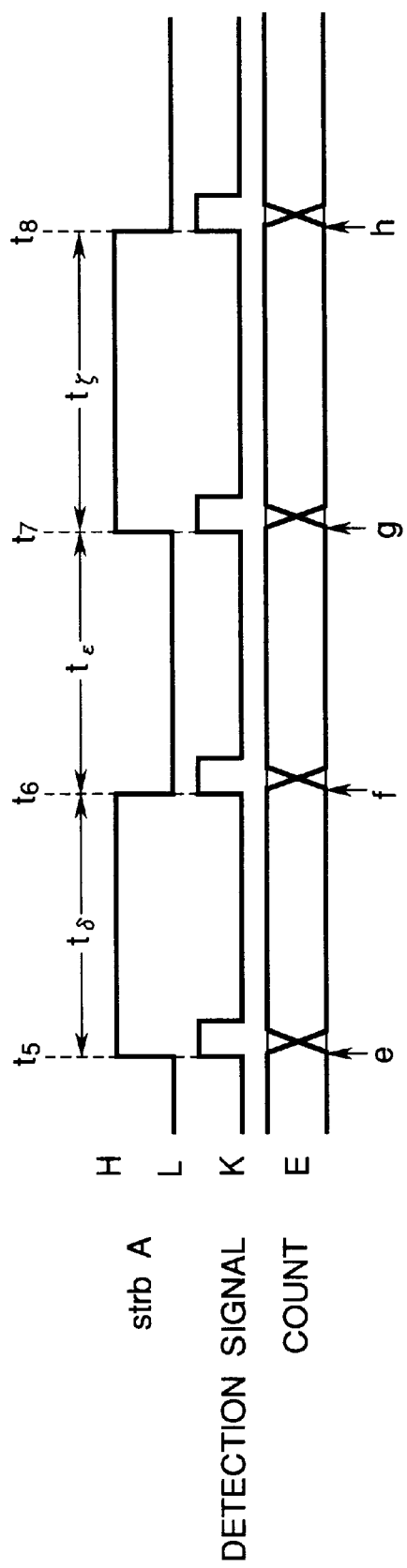
FIG. 7 is a timing chart showing points of change of the strobe signal in a data transfer system according to a second embodiment of the present invention.
Figure 8:
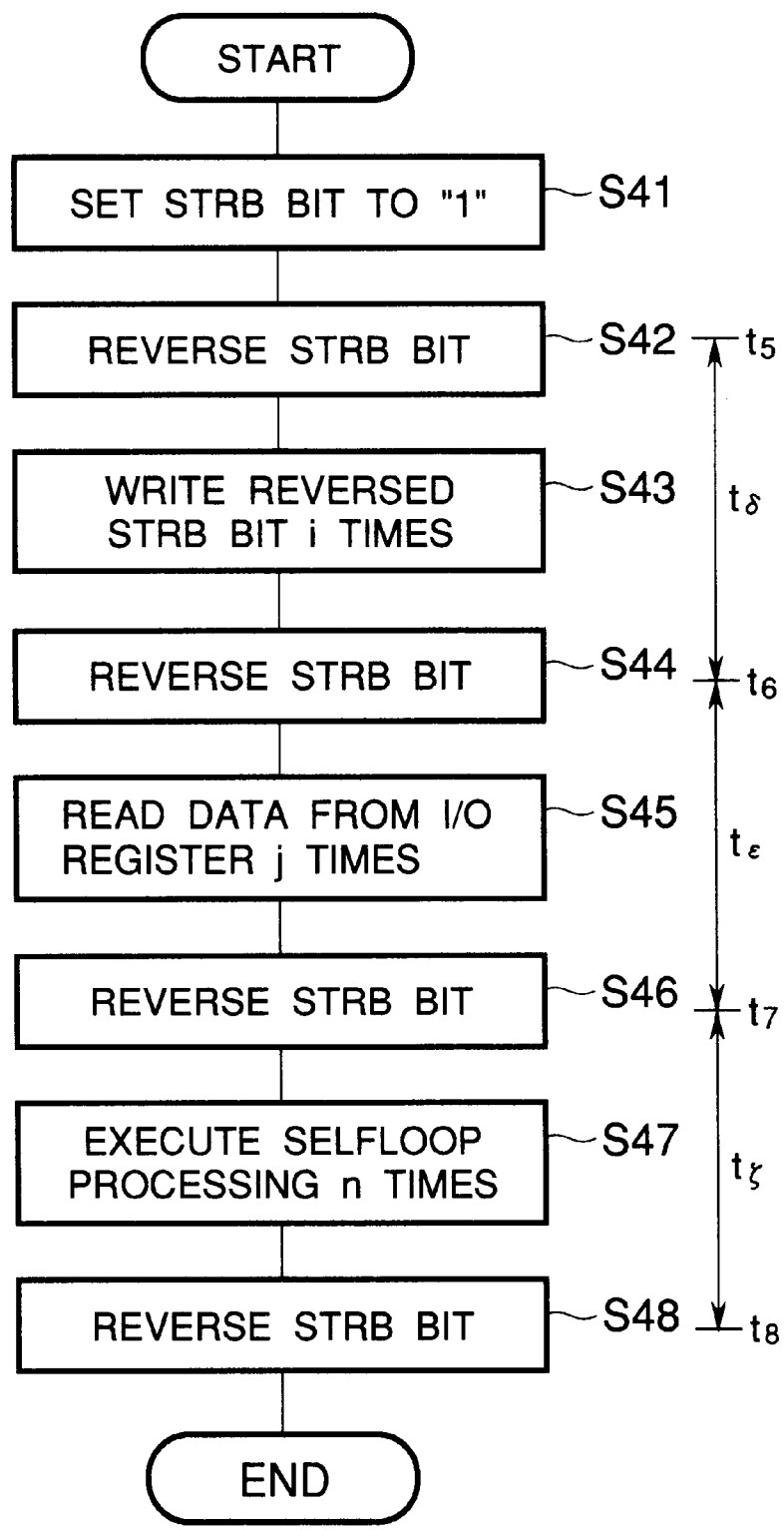
FIG. 8 is a flowchart showing process in the PC of producing the strobe signal according to the second embodiment.
Figure 9:
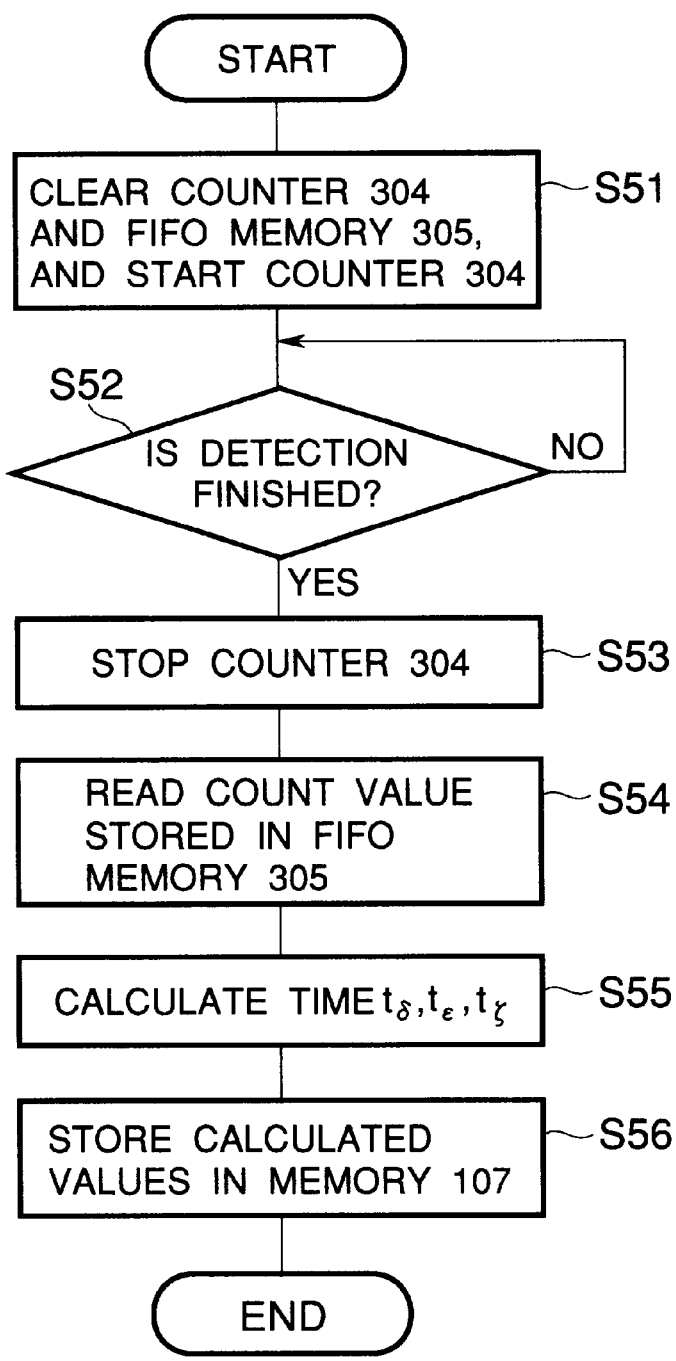
FIG. 9 is a flowchart showing process in the terminal unit of calculating the data processing rate of the PC according to the second embodiment.

FIG. 7 is a timing chart showing points of change of the strobe signal in a data transfer system according to a second embodiment of the present invention, FIG. 8 is a flowchart showing process in the PC of producing the strobe signal according to the second embodiment, and FIG. 9 is a flowchart showing process in the terminal unit of calculating the data processing rate of the PC according to the second embodiment. The data transfer system of the second embodiment has a similar construction to that shown in FIG. 1 and FIG. 2. Therefore, FIG. 1 and FIG. 2 are also referred in the following description of the second embodiment.

First, the process in the PC 101 of the second embodiment for transmitting the rate detection signal will be described. In the second embodiment, the PC 101 uses the strb A as the rate detection signal in the same manner as in the first embodiment. Referring to FIG. 8, the CPU 401 in the PC 101 sets the strb bit in the I/O register 403 of the parallel port 402 to "1", whereupon the strb A drops to L level (step S41). The CPU 401 then reverses the strb bit in the I/O register 403 to "0" (step S42), whereupon the strb A rises to H level at a point of time $t_5$ (shown in FIG. 7). The CPU 401 then writes the reversed strb bit into the I/O register 403 i times (step S43), where i represents an integer not less than 1. The CPU 401 reverses strb bit in the I/O register 403 to "1" again (step S44), whereupon the strb A drops to L level at a point of time $t_6$ (shown in FIG. 7).

Subsequently, the CPU 401 reads a status from the parallel port 402 j times (i.e., reads data from the I/O register 403 J times) (step S45), where j represents an integer not less than 1, and upon completion of the read-out, it reverses the strb bit in the I/O register 403 to "0" again (step S46), whereupon the strb A rises to H level again at a point of time $t_7$ (shown in FIG. 7). Finally, the CPU 401 executes selfloop processing n times according to its program (step S47), followed by a reversal of the strb bit in the I/O register 403 to "1" (step S48), whereupon the strb A drops to L level at a point of time $t_8$ (shown in FIG. 7), thus finishing the process of transmitting the rate detection signal from the PC 101 to the terminal unit 103.

Next, the process in the terminal unit 103 for measuring the data processing rate of the PC 101 in the second embodiment will be described with reference to FIG. 9. In the second embodiment, the case in which i=9, j=10 will be described.

Referring to FIG. 9, the CPU 104 of the terminal unit 103 clears the counter 304 and the FIFO memory 305, thus starting the counter 304 (step S51), which is then enabled to count a clock C. The clock C has a sufficient rate to enable a reliable detection of a change in the strb A and that the counter 304 has a counting capacity which is sufficient to count every step in the operation of the PC 101 to transmit the rate detection signal. Specifically, the clock C has a frequency of 1 [MHz] with an accuracy of 1 [$\mu s$] while the counter 304 has a number of bits on the order of around 7 bits, enabling 128 [$\mu s$] to be counted.

The CPU 104 monitors the control signal J from the parallel interface circuit 105, and judges whether or not the detection of the points of change in the strobe signal is completed (step S52). In the meantime, the signal detection circuit 302 produces a point of change detection signal K at each of points of time $t_5$, $t_6$, $t_7$ and $t_8$ of change in the strb A which is transmitted from the PC 101. A count E (e, f, g and h shown in FIG. 7) which prevails in the counter 304 is written into the FIFO memory 305 at the time the point of change detection signal K is inputted, thus terminating the detection of points of change in the signal. The FIFO memory 305 has a sufficient capacity to save these count values e, f, g and h.

When it is measured at the step S52 that the detection of points of change in the signal is finished, the CPU 104 stops the operation of the counter 304 (step S53), and reads out the count values e, f, g and h saved in the memory 305 by controlling the signal F (step S54). The signal F is normally formed by using the I/O read signal of the CPU 102. Subsequently, the CPU 104 calculates times $t_\delta$, $t_\epsilon$ and $t_\zeta$ from the count values e, f, g and h read, according to equations (10), (11) and (12) given below (step S55).

$$t_\delta = f - e \tag{10}$$

$$t_\epsilon = g - f \tag{11}$$

$$t_\zeta = h - g \tag{12}$$

The CPU 104 writes these values into the memory 107 (step S56), then terminating the determination of times of change in the rate detection signal. Using the values obtained from the equations (10), (11) and (12), a time $T_1$, required for the CPU 401 in the PC 101 to write the signal into the parallel port 402, a time $T_2$ required to read data from the parallel port 402 and a time $T_3$ to repeat a loop processing n times according to a program stored in the CPU 401 itself are calculated as follows:

$$T_1 = t_\delta / 10 \tag{13}$$

$$T_2 = (t_\epsilon - t_\delta / 10)/10 \tag{14}$$

$$T_3 = t_\zeta - t_\delta / 10 \tag{15}$$

Subsequently, in response to a request from the PC 101 to read the result of determination, the CPU 104 in the terminal unit 103 transmits the times $T_1$, $T_2$ and $T_3$ to the PC 101. In the second embodiment, the times $T_1$, $T_2$ and $T_3$ are calculated by the terminal unit, but as described above in connection with the first embodiment, it is also possible that these times be calculated by the PC 101 by causing the terminal unit 103 to transmit $t_s$, $t_e$ and $t_c$ to the PC 101.

The PC 101 then adjusts the data transfer rate on the basis of the times $T_1$, $T_2$ and $T_3$ in the same manner as described previously in connection with the first embodiment. In this manner, by performing a write-in and read-out with respect to the I/O register 403 of the strb bit which is reversed by the PC 101 a plurality of times, which is ten times in this example, consecutively, and dividing the value measured by the terminal unit 103 by the number of consecutive times to measure the data reception time, the accuracy of 0.1 [$\mu s$] can be achieved with $T_1$ and $T_2$ values if the hardware size of the counter 304 in the terminal unit 103 is reduced from ten bits to seven bits or reduced by a factor of 8.

What is claimed is:

1. A data transfer system comprising:
    a host computer for processing data at a data processing rate and transferring the data at a data transfer rate:
    a terminal unit for receiving the data transferred from said host computer; and
    a cable through which the data is transferred between said host computer and said terminal unit wherein;
    said host computer transfers a rate detection signal which contains information regarding the data processing rate of said host computer to said terminal unit;
    said terminal unit receives the rate detection signal and calculates the data processing rate of said host computer on the basis of the rate detection signal;
    said host computer adjusts the data transfer rate of said host computer on the basis of the data processing rate of said host computer calculated by said terminal unit;
    said terminal unit detects points of change of the rate detection signal, measures a time interval between the point of change of the rate detection signal and calculates the data processing rate based on the time interval between the points of change of the rate detection signal wherein:
    said host computer includes a register, the transfer of the rate detection signal from said host computer being conducted by writing data into said register and reversing the value of the rate detection signal to generate one of the points of change, by reading data from said register and reversing the value of the rate detection signal to generate one of the points of change, and by repeating selfloop processing a predetermined number of times and reversing the value of the rate detection signal to generate one of the points of change.

2. A data transfer system comprising:
    a host computer for processing data at a data processing rate and transferring the data at a data transfer rate;
    a terminal unit for receiving the data transferred from said host computer; and
    a cable through which the data is transferred between said host computer and said terminal unit wherein:
    said host computer transfers a rate detection signal which contains information regarding the data processing rate of said host computer to said terminal unit;
    said terminal unit receives the rate detection signal and calculates the data processing rate of said host computer on the basis of the rate detection signal;
    said host computer adjusts the data transfer rate of said host computer on the basis of the data processing rate of said host computer calculated by said terminal unit;
    said terminal unit detects points of change of the rate detection signal, measures a time interval between the point of change of the rate detection signal and calculates the data processing rate based on the time interval between the points of change of the rate detection signal wherein:
    said host computer includes a register, the transfer of the rate detection signal from said host computer being conducted by writing data into said register a predetermined number of times and reversing the value of the rate detection signal to generate one of the points of change, by reading data from the register a predetermined number of times and reversing the value of the rate detection signal to generate one of the points of change, and by repeating selfloop processing a predetermined number of times and reversing the value of the rate detection signal to generate one of the points of change.

3. A data transfer system according to claim 1, wherein the adjustment of the data transfer rate on the basis of the data processing rate by said host computer is conducted on the basis of a result of comparison of the data processing rate of said host computer and a data processing rate of said terminal unit.

4. A data transfer system according to claim 3, wherein, in the adjustment of the data transfer rate by said host computer, if the data processing rate of said host computer calculated by said terminal unit is above the data processing rate of said terminal unit, the data transfer rate is lowered by either reading the written data from said register or repeating the selfloop processing each time the data is transferred from said host computer to said terminal unit.

5. A data transfer system according to claim 2, wherein the adjustment of the data transfer rate on the basis of the data processing rate by said host computer is conducted on the basis of a result of a comparison of the data processing rate of said host computer and a data processing rate of said terminal unit.

6. A data transfer system according to claim 5, wherein, in the adjustment of the data transfer rate by said host computer, if the data processing rate of said host computer calculated by said terminal unit is above the data processing rate of said terminal unit, the data transfer rate is lowered by either reading data from said register or repeating the selfloop processing each time the data is transferred from said host computer to said terminal unit.

7. A data transfer system comprising:
    a host computer including a central processing unit and a register; and
    a terminal unit, data being transferred between said host computer and said terminal unit; wherein:
    said host computer transfers a rate detection signal to said terminal unit, the rate detection signal containing information regarding a time required to write data into said register, a time required to read data from said register, and a time required for said central processing unit to repeat selfloop processing a predetermined number of times;
    said terminal unit calculating a data processing rate of said host computer on the basis of the time required to write data into said register, the time required to read data from said register, and the time required to repeat selfloop processing a predetermined number of times; and
    said host computer adjusting the data transfer rate of said host computer on the basis of the data processing rate of said host computer calculated by said terminal unit.

8. A data transfer system of claim 7, wherein said host computer finishes the adjustment of the data transfer rate after said terminal unit has received the rate detection signal once.

* * * * *